Nov. 27, 1923.

C. TER COCK

CLUTCH

Filed Jan. 17, 1919

1,475,470

INVENTOR
*C. ter Cock.*
BY *L. R. Kerelake*
ATTORNEY

Patented Nov. 27, 1923.

1,475,470

UNITED STATES PATENT OFFICE.

CHRIS TER COCK, OF BAARN, NETHERLANDS.

CLUTCH.

Application filed January 17, 1919. Serial No. 271,758.

*To all whom it may concern:*

Be it known that I, CHRIS TER COCK, a subject of the Queen of the Netherlands, and residing at Eemnesserweg 63, Barrn, Netherlands, have invented certain new and useful Improvements Relating to Clutches, of which the following is a specification.

This invention relates to slipping friction clutches of the type in which a cushion spring is provided in addition to the main spring, and in which the friction contact surfaces are pressed together when the clutch is engaged in such a manner that the whole axial load on the friction contact surfaces is transmitted through the said cushion spring during a predetermined portion of the period of engaging or disengaging.

In this type of clutch as hitherto proposed, the cushion spring and the main spring have been cylindrical helical compression springs co-axial with the axis of the clutch, thus necessitating a considerable increase in the axial space occupied by the clutch.

In the present invention the main and cushion springs and the various parts of the clutch are so disposed that the axial space required is reduced to a minimum.

The invention consists in the combination with cushion springs of a main spring or springs of such form that the resilient material thereof lies approximately at right angles to the axis of the clutch or as near thereto as is consistent with the elastic yielding of the main spring or springs under varying loads, in such manner that the axial space required for the clutch may be reduced to that required for suitably mounting the axially displaceable clutch member or members.

The invention also consists in disposing the cushion springs at such radial distance from the axis of the clutch that they do not necessitate any addition to the axial length of the clutch over and above that required for suitably mounting the axially displaceable clutch member or members.

I append drawings illustrating my invention.

Figure 1:
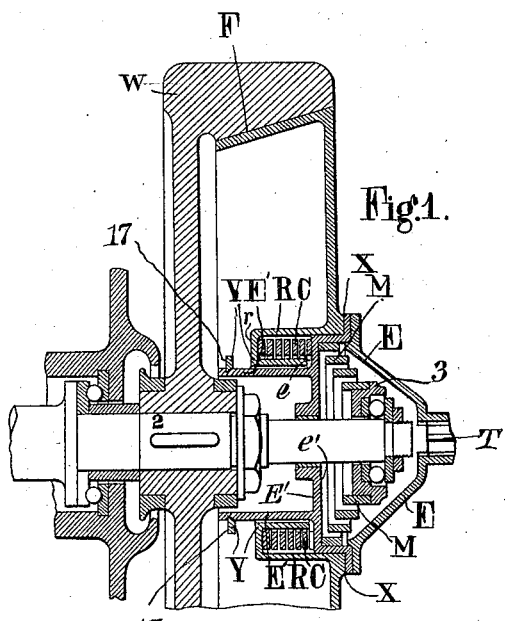
Figure 1A:
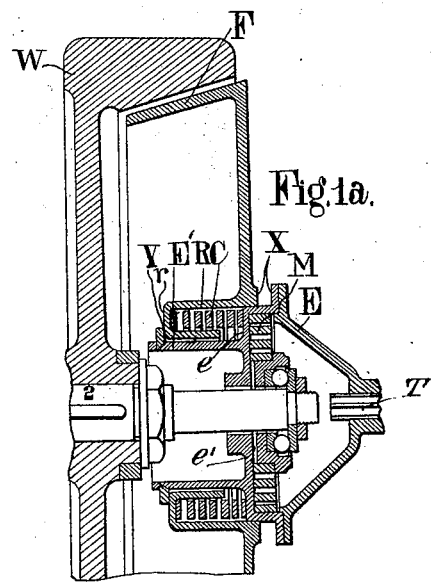

Figure 1 is a sectional view of a motor car cone clutch with a single volute main spring and a single cushion spring made of a bar or rod of rectangular section coiled in a cylindrical spiral. The axial movement of the slider to disengage the clutch is outwards.

Figure 1ª is a view showing the same clutch disengaged, the main spring being fully compressed and the cushion spring fully extended.

In Fig. 1, the clutch is shown fully engaged, that is, with the cushion spring fully compressed.

The driving member or flywheel W is fastened to the driving shaft 2 in any suitable manner. The driven member R is slidable relative to but rotates with a driven element E which in turn is slidable relative to but rotates with the driven shaft T. The main spring or springs M and the cushion spring or springs C act in opposition against the driven element E, or against parts connected thereto and which move axially and rotate therewith. The axial movement while engaging or disengaging the clutch is effected by any well known means (not shown), for example by a foot pedal in the case of a motor-car clutch, or by a handwheel and screw in the case of a clutch for engines, machine tools, electrical generators and the like, or by electrical means.

The disposition of the main and cushion springs and the various thrust bearings relative to the other parts varies to correspond with the general arrangement of the clutch. Many such arrangements are possible, that shown in the drawings being given by way of example.

In Figure 1, one end of the volute main spring M abuts against a collar 3 suitably mounted by a ball thrust bearing on an extension of the driving shaft, its other end against the element E′ which rotates with the driven clutch member R. The driven element E′ is mounted on an extension of the driving shaft 2, and is secured to the disc-like member E. The driven clutch member R is mounted on the element E′ so as to turn therewith but have a limited amount of axial movement relative thereto. The clutch being fully engaged the stop surfaces of the parts R and E′ which limit their relative axial movement in one direction are in contact at X. The stop surfaces which limit the relative axial movement in the opposite direction are at Y, that on element E′ being shown as a split ring 17, sprung into a shallow circumferential groove.

In constructing the driven element E′ and the driven clutch element R as shown in Figs. 1 and 1ª, the element E may be said to be in the form of an offset sleeve providing an exterior annular shoulder e through the medium of which latter shoulder slidable mounting of the element on the driving shaft extension is effected. The driven clutch element R is slidable on the enlarged portion of the element E' and is formed with an inturned flange portion r, slidably disposed on the smaller portion of the sleeve like body of the element E'. The coiled cushioning spring C is arranged about the smaller portion of the element E' and abuts the shoulder e and the flange r, while the outer surface of this flange forms one of the stop surfaces for coacting with the ring 17. In a like manner the outer surface of the element R forms one stop face X for coacting with the other stop face X in the form of an exterior annular flange on the outer edge of the enlarged sleeve body portion of the element E'. The disc-like or conical member E terminates in a flange which abuts the flange like stop X while the thrust bearing 3, as intimated is mounted on the driving shaft extension between the element E' and the member E so that the main spring M when the members W and R are disengaged lies against the shoulder e' as shown in Fig. 1ª.

It will be observed that in Figures 1 and 1ª the axial length required for the clutch depends entirely on that required for suitably mounting the axially displaceable clutch members E and E', including the ball thrust housing between the shaft and the main spring. The axial space occupied by the main spring is included in this, whereas if a cylindrical helical spring were interposed between the element E' and the collar or housing 3 of the ball thrust bearing, the axial length occupied by the said helical spring when fully compressed, would have to be added to the overall axial length.

The cushion springs are disposed at such radial distance that they do not necessitate any addition to the said axial length of the clutch. In fact, it will be observed that the axial length of the cushion spring in Figures 1 and 1ª could, if required, be made much greater than shown, without exceeding the overall axial length shown.

It will be seen that my invention provides a more effective control of the load on the friction contact surfaces, a definite increase or diminution of such load being produced by a definite amount of movement of the slider, whereas in the ordinary clutch the load is reduced from the maximum to zero by a very small movement of the slider; in the latter case the load on the friction contact surfaces being determined rather by the pressure exerted on the slider than by the position thereof.

In a clutch made according to my invention, the main spring or springs may be made sufficiently powerful to ensure that no slipping occurs when the clutch is transmitting the maximum torque for which it is designed, thus obviating the necessity of providing an additional positive dog clutch or the like, which is engaged after the friction clutch has "picked up" the load, as is sometimes done with clutches for transmitting heavy loads; the smoothness of action during the take up of the load being ensured by the cushion spring or springs.

Having now described my invention, what I claim as new and desire to secure by Letters Patent is:—

1. In a clutch of the character described the combination with a driving shaft having an extension, a driven shaft and a driving clutch member mounted on the driving shaft of a sectional driven element composed of two sections rotatable with the driven shaft and slidable relative thereto, a driven clutch element slidable on one of the sections of the driven element, spring cushioning means between one section of the driven element and the driven clutch element and main spring means operably mounted on the extension of the driving shaft and acting on the driven element in opposition to the spring cushioning means.

2. In a clutch of the character described, in combination, a driving shaft having an extension, a driven shaft, a driving clutch element mounted on the driving shaft, a driven element composed of two sections one of which is slidably mounted on the driving shaft extension while the other is slidable on and rotatable with the driven shaft, a driven clutch element slidably mounted on the driven element section on the driving shaft extension, a coiled cushioning spring arranged on the driven element section on the driving shaft extension and bearing against said element section and the driven clutch element, a thrust bearing on the extension of the driving shaft and a single volute main spring connected with the thrust bearing and with the driven element section on the driving shaft extension and acting in opposition to the coiled cushioning spring.

3. In a clutch of the character described, in combination with a driving shaft having an extension, a driven shaft, a driving clutch element mounted on the driving shaft, a sectional driven element composed of two sections one of which is slidably mounted on the driving shaft extension while the other is slidably but non-rotatably connected with the driven shaft, the section on the driving shaft extension consisting of an offset sleeve-like body forming an exterior annular shoulder and having an interior annular shoulder for slidable engagement with the shaft extension, a stop ring on a small portion of the sleeve-like body of said section, another exterior annular shoulder forming a stop surface on the outer edge of the enlarged portion of the sleeve-like body of the said section, the section on the driven shaft being disc-shaped and formed with an annular flange for coacting with the last mentioned flange, a driven clutch element slidable on the enlarged portion on the driving shaft extension and formed with an inturned flanged portion for slidable engagement with a small portion of said section, a coiled cushioning spring arranged within the driven element and bearing against the flange portion thereof and against the first mentioned exterior shoulder of the section on the driving shaft extension, the inturned flanged portion coacting with the stop ring, the outer face of the driven clutch element coacting with the last mentioned flange on the face of the section on the driving shaft extension, a thrust bearing on the driving shaft extension and a single volute main spring connected with the thrust bearing and with the internal shoulder of the section on the driving shaft extension.

In testimony whereof I have signed my name to this specification.

CHRIS ter COCK.

Witnesses:
D. Kleyn,
M. Alvarado.